United States Patent [19]

Nolte et al.

[11] Patent Number: 4,845,830

[45] Date of Patent: Jul. 11, 1989

[54] METHOD OF ASSEMBLING A WINDOW OPERATOR

[75] Inventors: Douglas A. Nolte, Owatonna, Minn.; Dennis J. Rooney, Fullerton, Calif.

[73] Assignee: Truth Incorporated, Owatonna, Minn.

[21] Appl. No.: 70,411

[22] Filed: Jul. 7, 1987

[51] Int. Cl.⁴ .............................................. B23P 11/00
[52] U.S. Cl. .................................... 29/432.1; 29/509; 29/512; 29/522.1; 29/525.1; 49/351; 403/162; 403/282
[58] Field of Search ...................... 29/432, 432.1, 505, 29/509, 512, 522.1, 526.1; 49/349, 350, 351; 403/162, 276, 282

[56] References Cited

U.S. PATENT DOCUMENTS

| | | | |
|---|---|---|---|
| 1,925,501 | 9/1933 | Sattler et al. | 49/351 |
| 2,676,042 | 4/1954 | Roethel | 49/351 X |
| 3,461,609 | 8/1969 | Armstrong | 49/356 X |
| 3,571,903 | 3/1971 | Perrson | 29/432.1 |
| 4,191,060 | 3/1980 | Sessa | 49/352 X |
| 4,269,550 | 5/1981 | DiGiulio | 29/432 X |
| 4,782,216 | 3/1988 | Disborg | 29/432 X |

OTHER PUBLICATIONS

Truth Incorporated Drawing No. 84123A, dated 8-20-84.

Primary Examiner—Timothy V. Eley
Assistant Examiner—Frances Chin
Attorney, Agent, or Firm—Wood, Dalton, Phillips, Mason & Rowe

[57] ABSTRACT

A window operator and assembly method therefor wherein a stacked pull arm and gear are rotatably mounted on a bushing carried by a mounting base and the gear and pull arm are assembled to the mounting base with a controlled clearance independent of the tolerance of these components by use of a hardened metal bushing. The hardened metal bushing is forced into the deformable metal of the mounting base whatever distance is necessary to locate an exposed end of the bushing a fixed distance beyond the uppermost of said gear and pull arm and provide a surface against which a washer may be mounted and which overlies the pull arm and gear to hold the components in assembled relation with the controlled clearance.

4 Claims, 1 Drawing Sheet

METHOD OF ASSEMBLING A WINDOW OPERATOR

FIELD OF THE INVENTION

This invention pertains to a window operator and a method of assembly thereof utilizing a metal bushing on which stacked rotatable components are mounted and which is forced into the deformable metal of a mounting base to provide a controlled clearance for the stacked components and reduce play which would otherwise occur because of a build-up of tolerances of the components.

BACKGROUND OF THE INVENTION

Manually operable window operators for casement and awning type windows are well known in the art. It is typical of such a window operator to have a mounting base which rotatably mounts a gear and pull arm. The gear meshes with a worm gear on a worm shaft having a handle affixed thereto and a pull arm is operatively connected to a window whereby rotation of the worm shaft results in rotation of the gear and the pull arm for window movement.

In a specificc form of window operator of this type, a pin extending upwardly through a recess in the mounting base mounts a bushing and a stacked assembly of the gear and pull arm each having an opening are rotatably associated with the mounting base by positioning on the bushing. A washer is secured to the pin in overlying relation to the gear and pull arm to complete the assembly of the window operator. The association of the washer with the pin must be at a location lengthwise of the pin to take into account the extreme amounts of tolerance resulting from tolerance variations in the thickness of the blank from which the gear is made and the thickness of the metal from which the pull arm is formed. This can result in a window operator having a considerable amount of play axially of the bushing which is undesirable in a window operator.

SUMMARY OF THE INVENTION

A primary feature of the invention is to provide a window operator and a method for assembling such operator wherein the stacked components are assembled with a controlled clearance to reduce play therebetween and by use of a metal bushing about which a gear and pull arm of the window operator may rotate and which is forced into the deformable metal of a mounting base of the operator to establish a controlled distance of an exposed end of the bushing beyond the stacked gear and pull arm. A washer is fixed to a mounting pin to overlie the stacked gear and pull arm and in abutting relation with the exposed end of the bushing to achieve a controlled clearance determined by the extent to which the bushing has been forced into the mounting base.

An object of the invention is to provide a method of assembling a stacked pull arm and gear of a window operator to a mounting base of deformable metal with a controlled clearance for rotational movement of the pull arm and gear about a pin associated with the mounting base without excessive play and with said pull arm and gear each having a mounting opening comprising, positioning a hardened metal bushing on said pin and in said openings of the pull arm and gear with one end of the bushing in a recess in said mounting base and the other end extending beyond the gear and pull arm, and exerting a force on said other end of the bushing to force said one end of the hardened metal bushing into the deformable metal of the mounting base to advance said other end until said other end extends beyond said gear and pull arm a predetermined distance, and fixing a washer to said pin in engagement with said other end of the hardened metal bushing and overlying the gear and pull arm to hold the gear and pull arm in assembled relation with the mounting base.

Still another object of the invention is to provide a method as defined in the preceding paragraph wherein the forcing of the hardened metal bushing into the metal of the mounting base causes a flow of the deformed metal and the end of the bushing has a bevel to provide a space into which the deformed metal may flow.

Still another object of the invention is to provide a window operator having controlled clearance between components, said components including a mounting base of deformable metal, a gear and a pull arm each having an opening and which are in stacked relation, a pin fixed to the mounting base, a hardened metal bushing on said pin and extended through said openings, and a washer fitted onto said pin and engaging said bushing, said hardened metal bushing having a bevelled end pressed into and deforming the metal of said mounting base to have an exposed end of the hardened metal bushing a predetermined distance beyond the uppermost of said stacked gear and pull arm.

DESCRIPTION OF THE PREFERRED EMBODIMENT

Figure 1:
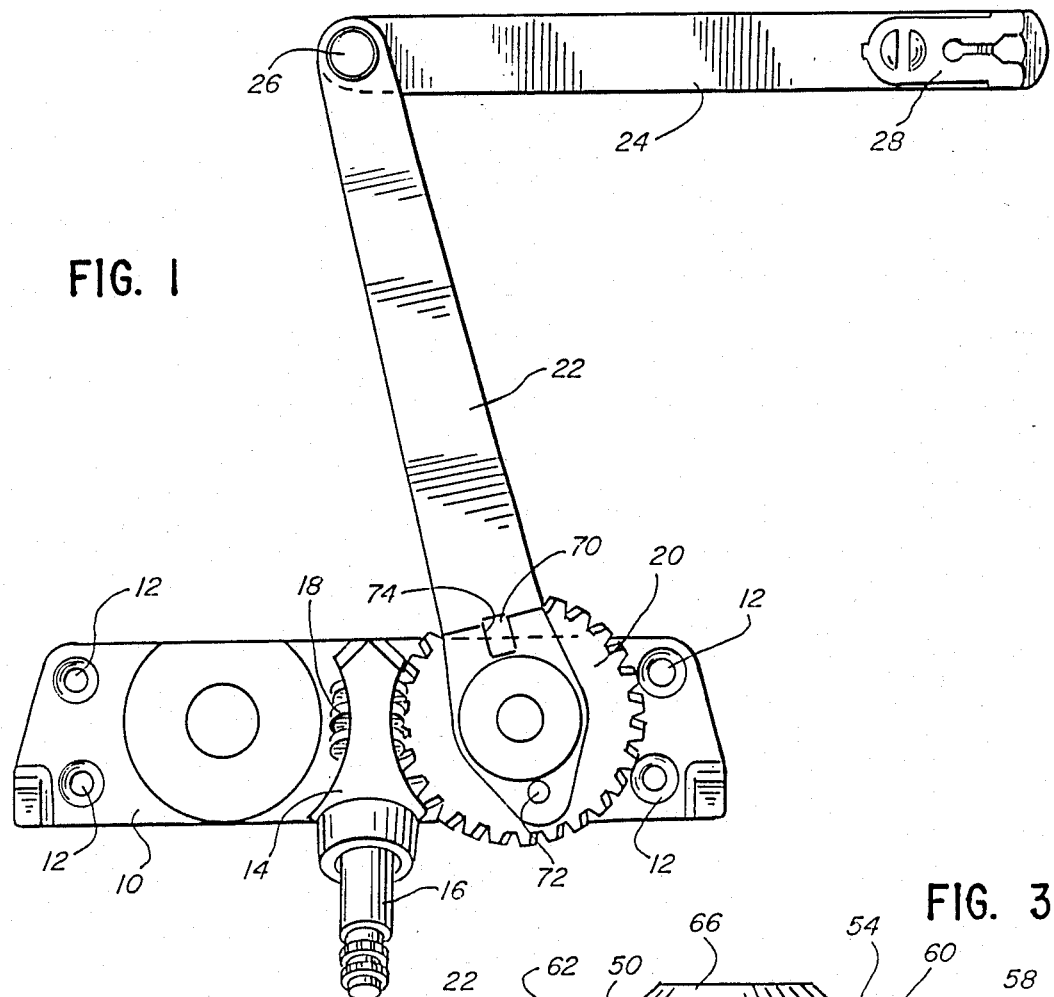
FIG. 1 is a plan view of the window operator with a handle omitted.
Figure 2:
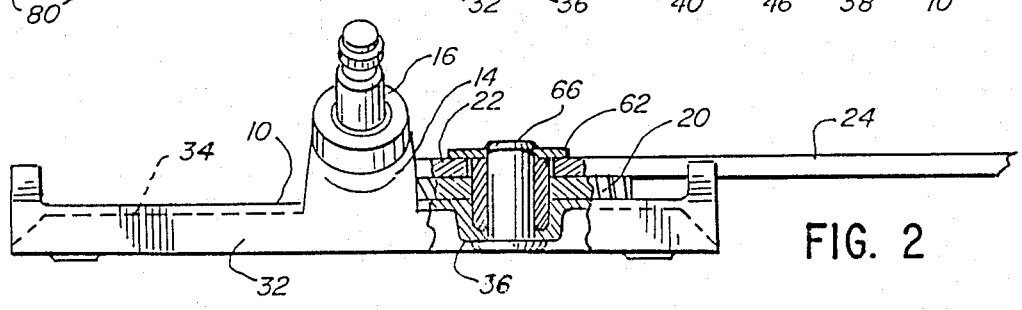
FIG. 2 is front elevational view of the structure shown in FIG. 1 with parts broken away and shown in section.

The window operator is shown generally in FIGS. 1 and 2 and has a mounting base 10 formed of a deformable metal such as zinc and which, for ease of manufacture, is formed for mounting of components to provide either a right hand or left hand operator with a left hand operator being shown in the drawings. The disclosed window operator is for mounting under a window sill cover and thus being hidden from view does not require a cover although the principles of the invention disclosed herein are applicable to exposed window operators having a cover. The mounting base 10 has openings 12 for receiving fasteners which attach the mounting base to window framing and a central upwardly angled generally tubular section 14 which rotatably mounts a worm gear shaft 16 having an exposed end to which a handle can be mounted and having a worm gear 18 exposed through open sides of the tubular section 14 for meshing with a gear 20. Rotation of the worm gear 18 causes rotation of the gear 20 with resulting rotation of a pull arm 22 which has a drag link pivotally connected thereto at a pivot connection 26. The drag link 24 has a keeper sub-assembly 28 at a free end thereof to enable connection of the drag link to a slide or other member associated with the window. Such a keeper structure is well known in the art and is of the type shown in Armstrong U.S. Pat. No. 3,461,609.

Figure 3:
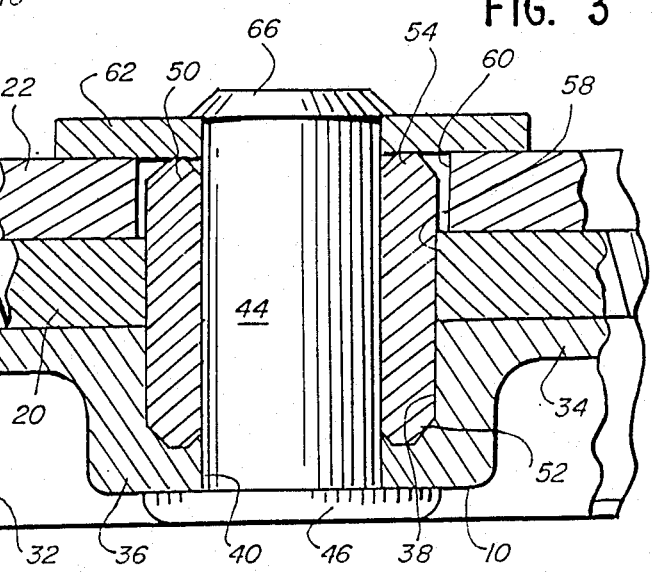
FIG. 3 is an enlarged view of that part of FIG. 2 which is shown broken away and in section.
Figure 4:
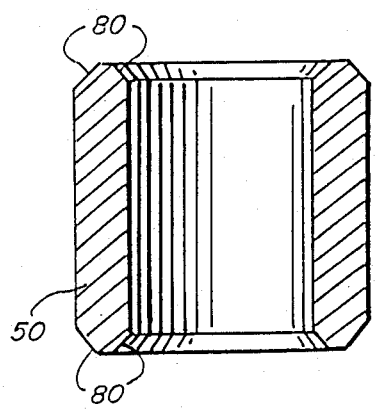
FIG. 4 is a central sectional view of the hardened metal bushing on the scale of FIG. 3.

The gear 20 and pull arm 22 are rotatably mounted on the mounting base 10 by structure shown particularly in FIGS. 2 and 3.

The mounting base has a perimetral flange 32 to provide a raised base panel 34 with a downwardly formed section 36 having a recess 38 and an end wall with an opening 40. A pin 44 extends through the opening 40 and has a head 46 abutting the formed section 36. A hardened metal bushing 50 surrounds the pin 44 and has one end 52 engaged with the formed section 36 of the housing 10 and the other end 54 is positioned slightly above the upper surface of the pull arm 22. The gear 20 has an opening 58 to mount the gear on the bushing 50 and the pull arm 22 has a slightly larger opening 60 to enable positioning thereof in surrounding relation to the bushing 50.

A washer or a retaining member 62 is positioned on the pin 44 in overlying relation to the pull arm 22 which is the uppermost component of the stacked pull arm and gear and engages the end 54 of the bushing and is held in assembled relation by a deformed end 66 of the pin which can be deformed by a spin operation known in the art.

The gear 20 and pull arm 22 are interconnected for rotation together by a pair of slugs 70 and 72 fitted in openings in the pull arm 22 and which depend downwardly from the lower surface thereof to engage in openings in the gear 20. The slug 70 is generally rectangular and engages in a generally rectangular slot 74 in the gear and a second opening in the gear receives the slug 72.

The gear 20 is formed from a gear blank and the pull arm 22 is formed from a sheet of metal such as steel and with there being tolerance variations in the thickness of both the gear blank and the metal sheet. In order to avoid play in the gear and pull arm which could result from an assembly of the window operator with the washer 62 at a predetermined fixed distance from the head 46 of the pin which is set to take into account maximum thickness of the gear end pull arm, the novel method of assembly provides for use of the hardened metal bushing 50. The metal bushing can have the end 52 thereof forced into the deformable metal of the mounting base 10 until the end 54 of the bushing is a predetermined distance beyond the upper face of the pull arm 22. This establishes a controlled clearance wherein the tolerance of each of the gear and pull arm is not critical.

More particularly, the assembly method comprises assembling the pin 44 with the mounting base and positioning of the bushing 50 on the pin 44 followed by mounting of the gear 20 and pull arm 22 on the bushing. By means of a tool or manually, a force is then exerted on the end 54 of the bushing and reacted by the head 46 of the pin engaging a support surface and sufficient force is applied to cause advance of the lower end 52 of the bushing into the deformable metal of the base until the end 54 of the bushing extends beyond the upper face of the form 22 a predetermined distance, such as 0.005 inches, for example. The washer 62 is then applied to the pin and fixed thereto by deforming the end 66 of the pin 44. With this assembly method, variations in the tolerance of the gear and pull arm are not critical and in assembling each window operator, the bushing 50 can be advanced whatever distance is necessary to provide the controlled projection of the end 54 thereof. The operation is enhanced by providing internal and external bevels 80 at each end of the bushing 50 whereby either end of the bushing can be initially inserted into the recess 38 of the mounting base. The bevels provide a space for flow of deformable zinc or other metal of the mounting base as seen in FIG. 3 with resulting locking of the bushing to the mounting base and to the pin 44.

As mentioned previously, the exposed end of the hardened metal bushing can be, for example, 0.005" above the stacked pull arm and gear. This provides for adequate freedom of rotation of the pull arm and gear. In the prior art structure there could be a tolerance build-up of 0.028" and allowance for this could result in excessive play in the components of the window operator.

We claim:

1. The method of assembling a pull arm and a gear of a window operator to a mounting base of deformable metal with a controlled clearance for rotational movement of the pull arm and gear about a pin associated with the mounting base without excessive play and with said pull arm and gear each having a mounting opening comprising, positioning a hardened metal bushing on said pin and in said opening of the pull arm and gear with one end of the bushing in a recess in said mounting base and the other end extending beyond the gear and pull arm, and exerting a force on said other end of the bushing to force said one end of the hardened metal bushing into the deformable metal of the mounting base to advance said other end until said other end extends beyond said gear and pull arm a predetermined distance, and fixing a washer to said pin in engagement with said other end of the hardened metal bushing and overlying the gear and pull arm to hold the gear and pull arm in assembled relation with the mounting base.

2. The method of claim 1 wherein said one end of the bushing is bevelled to provide spaces into which housing metal may flow.

3. The method of assembling a window operator having a mounting base of deformable metal and a recess, a headed pin extending through said recess, a hardened metal bushing on said pin with one end in said recess, a washer on said pin and engaged with the other end of the bushing, a stacked gear and pull arm each having an opening for rotatable mounting on said bushing and positioned between said mounting base and said washer, comprising, assembling the pin and bushing on the mounting base with the gear and pull arm on the bushing and with said other end of the bushing extending outwardly of the gear and pull arm, exerting a force on said other end of the bushing to advance said one end of the bushing into said deformable metal until said other end is a predetermined distance beyond the gear and pull arm, placing the washer on the pin to overlie a portion of the uppermost one of said gear and pull arm, and deforming an end of the pin to hold the washer in position.

4. The method of assembling components of a window operator to a mounting base of deformable metal with controlled clearance between components, said components including a gear and a pull arm each having an opening and which are held in assembled stacked relation on the mounting base by a hardened metal bushing extended through said openings and fitted onto a pin fixed to the mounting base and a retaining member on said pin comprising, forcing said hardened metal bushing into said mounting base to move an exposed end of the hardened metal bushing toward the stacked gear and pull arm and until it is a predetermined distance beyond the uppermost of said stacked gear and pull arm, and fixing said retaining member to the pin in overlying relation to said gear and pull arm and abutting said exposed end of the hardened metal bushing.

* * * * *